(12) United States Patent
Foskey et al.

(10) Patent No.: US 9,074,638 B2
(45) Date of Patent: Jul. 7, 2015

(54) MULTILINK CONSTANT VELOCITY JOINT

(71) Applicant: Bell Helicopter Textron Inc., Fort Worth, TX (US)

(72) Inventors: Christopher Foskey, Keller, TX (US); Frank B. Stamps, Colleyville, TX (US); Richard Rauber, Euless, TX (US)

(73) Assignee: Bell Helicopter Textron Inc., Fort Worth, TX (US)

(*) Notice: Subject to any disclaimer, the term of this patent is extended or adjusted under 35 U.S.C. 154(b) by 0 days.

(21) Appl. No.: 13/828,509

(22) Filed: Mar. 14, 2013

(65) Prior Publication Data

US 2014/0274427 A1    Sep. 18, 2014

(51) Int. Cl.
| | | |
|---|---|---|
| *F16D 3/50* | (2006.01) | |
| *F16D 3/60* | (2006.01) | |
| *B64C 27/37* | (2006.01) | |
| *B64C 27/12* | (2006.01) | |

(52) U.S. Cl.
CPC ............. *F16D 3/60* (2013.01); *Y10T 29/49643* (2015.01); *B64C 27/37* (2013.01); *B64C 2027/125* (2013.01)

(58) Field of Classification Search
CPC ........... F16D 3/28; F16D 3/70; Y10S 416/50; Y10S 464/904; Y10S 464/905; F10D 5/16; F10D 5/26; B64C 27/04; B64C 27/12
USPC .............. 464/69–72, 125–127, 180.904, 905, 464/138, 152; 244/60; 416/500; 29/889
See application file for complete search history.

(56) References Cited

U.S. PATENT DOCUMENTS

| | | | | |
|---|---|---|---|---|
| 2,619,211 | A | * | 11/1952 | Belden .......................... 464/72 X |
| 2,902,844 | A | * | 9/1959 | Rzeppa .......................... 464/152 |
| 4,293,276 | A | | 10/1981 | Brogdem et al. |
| 4,729,753 | A | | 3/1988 | Neathery et al. |
| 5,186,686 | A | | 2/1993 | Staples et al. |
| 6,296,444 | B1 | | 10/2001 | Schellhase et al. |
| 2008/0267778 | A1 | | 10/2008 | Stamps et al. |
| 2011/0280727 | A1 | | 11/2011 | Stamps et al. |
| 2013/0341458 | A1 | * | 12/2013 | Sutton et al. |

FOREIGN PATENT DOCUMENTS

WO    2012161680 A1    11/2012

OTHER PUBLICATIONS

Communication from a Counter-Part Application; Extended European Search Report; European Application No. EP 13171411.5; Oct. 10, 2013; 3 pgs.
Communication from a Counter-Part Application; Communication Pursuant to Article 94(3) EPC; European Office Action; European Application No. EP 13171411.5; Oct. 24, 2013; 5 pgs.

* cited by examiner

*Primary Examiner* — Gregory Binda
(74) *Attorney, Agent, or Firm* — Fish & Richardson P.C.

(57) ABSTRACT

An apparatus comprising a rotor hub system comprising a floating plate, a plurality of drive link trunnions each comprising a pivoting arm and positioned radially about the floating plate, wherein each drive link trunnion is coupled to the floating plate via the pivoting arm, and a housing disposed about the floating plate, coupled to each of the drive link trunnions, and configured to couple to a mast. Included is an apparatus comprising a floating plate, a plurality of drive link trunnions each comprising a pivoting arm and positioned radially about the floating plate, wherein each drive link trunnion is coupled to the floating plate via the pivoting arm, and wherein the drive link trunnions are configured to move the floating plate in response to a force applied to the drive link trunnions, and a housing disposed about the floating plate and coupled to each of the drive link trunnions.

15 Claims, 5 Drawing Sheets

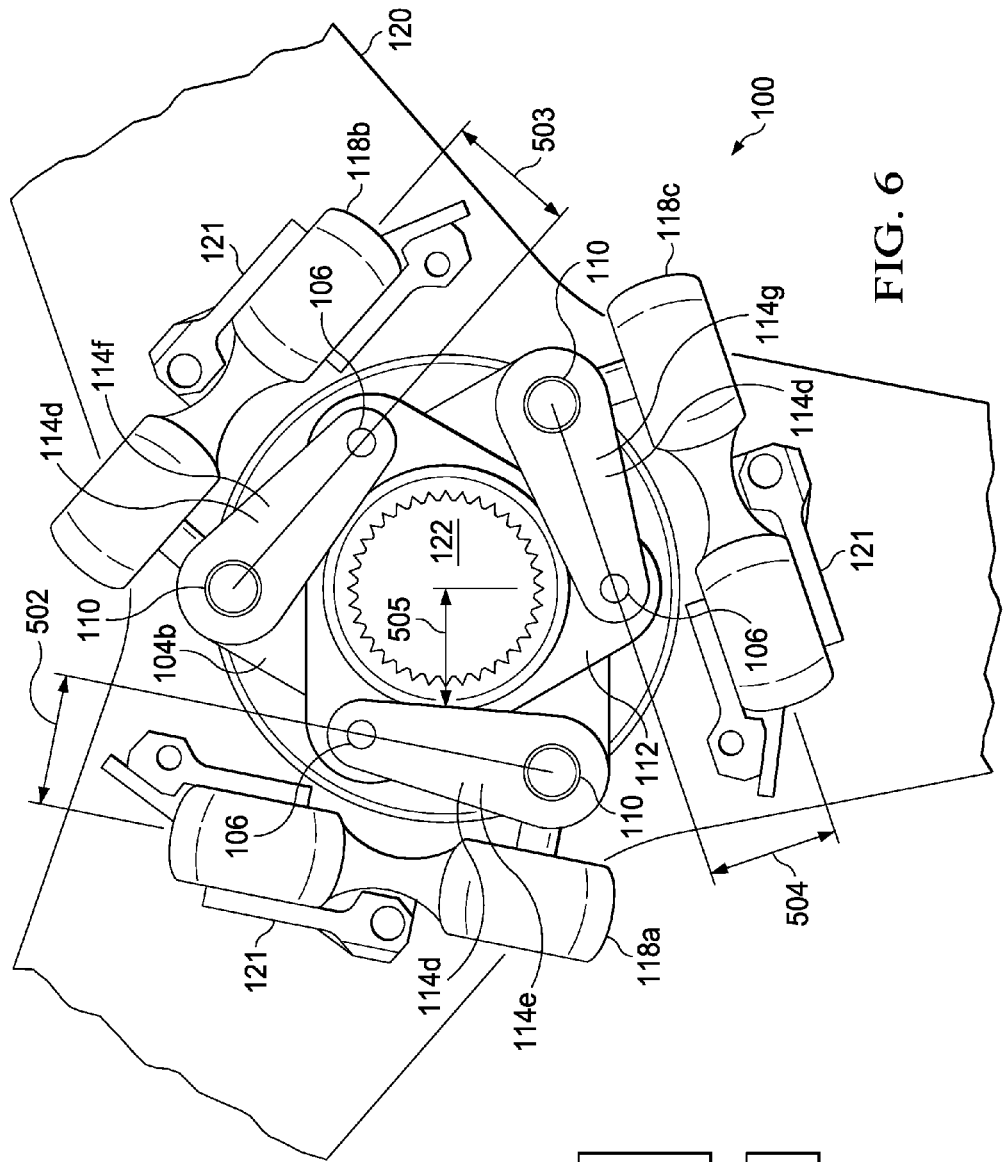
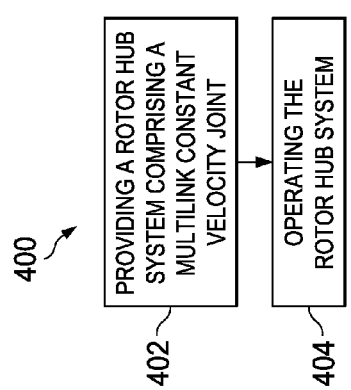
FIG. 5
FIG. 6

MULTILINK CONSTANT VELOCITY JOINT

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Constant velocity (CV) joints may be employed to provide uniform power transmission between a driving member (e.g., a helicopter mast) and a driven member (e.g., a yoke) in a power train. For example, CV joints may be provided between a mast and a yoke coupled to a plurality of blades, giving rise to a relatively complex assembly at the rotor hub assembly. Examples of such conventional rotor hub systems are described in U.S. Pat. No. 4,729,753 and U.S. Pat. No. 6,296,444. In such embodiments, the rotor hub system may employ a plurality of elastomeric bearings and a drive trunnion to provide movement in the constant velocity joint. During operation, conventional systems may generate a kinematic error (e.g., oscillatory strain, lateral wobbling, etc.) within the rotor hub system. Such a kinematic error may result in excessive stress forces being applied to one or more components of one or more CV joints (e.g., bearings) and/or the rotor hub system. In an embodiment, it may be desirable to alleviate and/or normalize such kinematic errors to improve the performance and reliability of the rotor hub system.

SUMMARY

In one aspect, the disclosure includes an apparatus comprising a rotor hub system comprising a floating plate, a plurality of drive link trunnions each comprising a pivoting arm and positioned radially about the floating plate, wherein each drive link trunnion is coupled to the floating plate via the pivoting arm, and a housing disposed about the floating plate, coupled to each of the drive link trunnions, and configured to couple to a mast.

In another aspect, the disclosure includes an apparatus comprising a floating plate, a plurality of drive link trunnions each comprising a pivoting arm and positioned radially about the floating plate, wherein each drive link trunnion is coupled to the floating plate via the pivoting arm, and wherein the drive link trunnions are configured to move the floating plate in response to a force applied to the drive link trunnions, and a housing disposed about the floating plate and coupled to each of the drive link trunnions.

In yet another aspect, the disclosure includes a method comprising providing a rotor hub system comprising a multilink constant velocity joint (MCVJ) comprising a floating plate, a plurality of drive link trunnions each comprising a pivoting arm and positioned radially about the floating plate, wherein each drive link trunnion is coupled to the floating plate via the pivoting arm, and wherein the drive link trunnions are configured to move the floating plate in response to a force applied to the drive link trunnions, and a housing disposed about the floating plate and coupled to each of the drive link trunnions.

BRIEF DESCRIPTION OF THE DRAWINGS

For a more complete understanding of the present disclosure and the advantages thereof, reference is now made to the following brief description, taken in connection with the accompanying drawings and detailed description:

FIG. 5 is a flowchart of an embodiment of a torque normalization method; and

FIG. 6 is a top plan view of an embodiment of a portion of a rotor hub system having a multilink constant velocity joint and having the upper hub plate and upper housing plate removed.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are embodiments of a multilink constant velocity joint (MCVJ), a rotor hub system comprising a MCVJ, and methods of using the same. In an embodiment, the MCVJ may be employed to reduce and/or normalize kinematic errors (e.g., oscillatory strain, lateral wobbling, etc.) introduced during operation of the rotor hub system, as will be disclosed herein.

Figure 1:
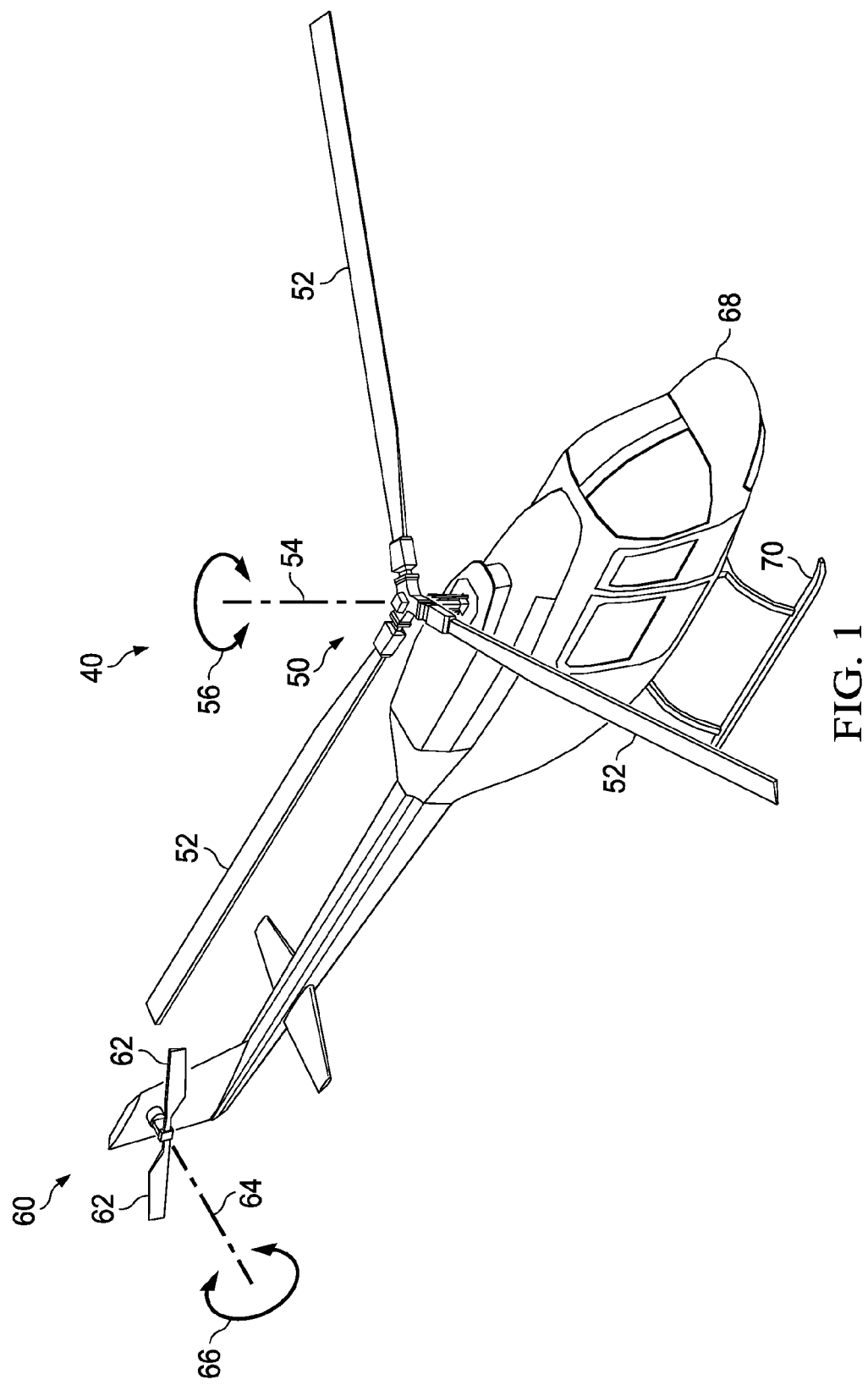
FIG. 1 is a perspective view of an embodiment of a helicopter having a multilink constant velocity joint.

FIG. 1 is a perspective view of a helicopter 40. Certain embodiments of the disclosure may be used with a helicopter such as helicopter 40. However, it should be understood that the helicopter example is given merely for illustration purposes only. Embodiments of the present disclosure are not limited to any particular setting or application, and embodiments can be used with a drive system in any setting or application such as other aircrafts, vehicles, or equipment.

In an embodiment, the helicopter 40 includes a main rotor assembly 50, a tail rotor assembly 60, a fuselage 68, and landing gear 70. The main rotor assembly 50 includes two or more blades 52 that are rotated about an axis of rotation 54 in either a clockwise direction or a counterclockwise direction as indicated by arrow 56. The main rotor assembly 50 generates a lift force that supports the weight of helicopter 40 and a thrust force that counter acts aerodynamic drag. Additionally, the main rotor assembly 50 can also be used to induce pitch and roll of the helicopter 40. The tail rotor assembly 60 includes two or more blades 62 that are rotated about an axis of rotation 64 in either a clockwise direction or a counterclockwise direction as indicated by the arrow 66. The tail rotor assembly 60 counters the torque effect created by the main rotor assembly 50 and allows a pilot to control the yaw of the helicopter 40. The fuselage 68 is the main body section the helicopter 40. Optionally, the fuselage 68 holds the crew, passengers, and/or cargo and houses the engine, transmission, gearboxes, drive shafts, control systems, etc. that are needed to establish an operable helicopter. The landing gear 70 is attached to the fuselage 68, supports the helicopter 40 on the ground, and allows it to take off and land. Of course, FIG. 1 is just an example of a vehicle in which the disclosed systems could be used, and it will be appreciated that the disclosed systems could be used in any other aircraft (airplane, tiltrotor, etc.), vehicle, or equipment.

Figure 2:
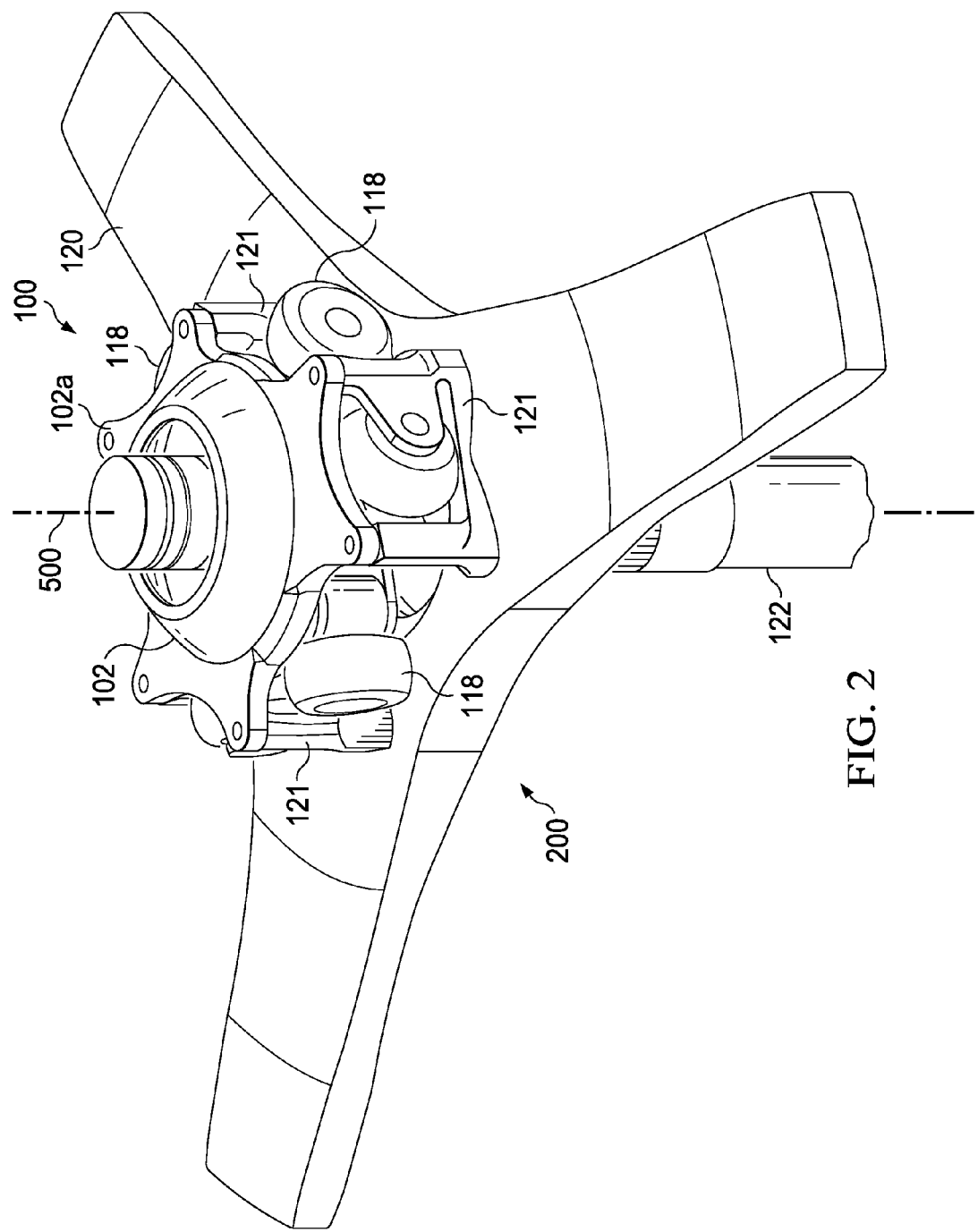
FIG. 2 is a perspective view of an embodiment of a rotor hub system.
Figure 3:
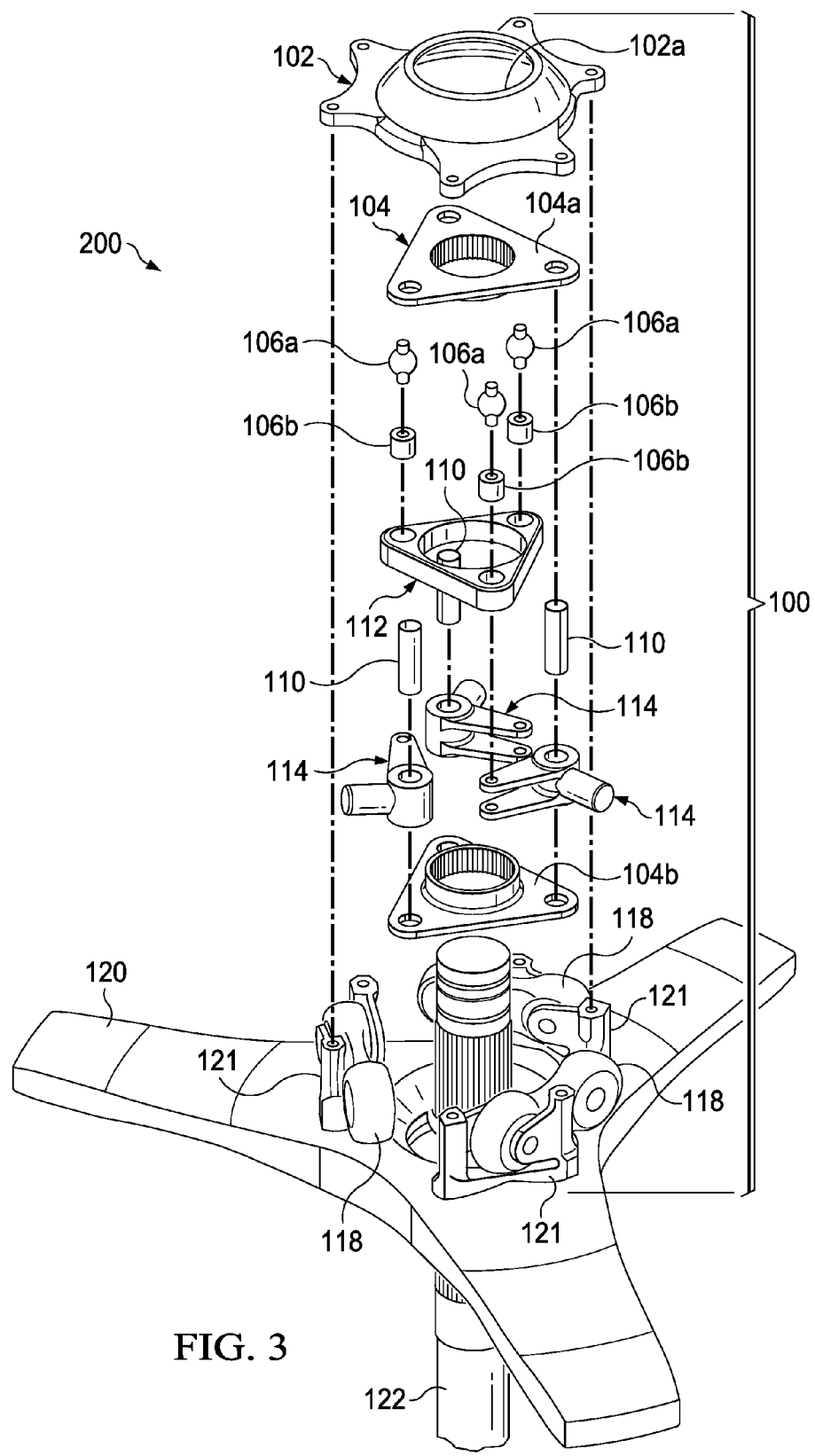
FIG. 3 is an exploded view of an embodiment of a rotor hub system.

In the embodiments of FIGS. 2 and 3, a rotor hub system 200 is illustrated. In such an embodiment, the rotor hub system 200 may generally comprise a mast 122, a MCVJ 100, a plurality of drive links 118, a hub assembly 102, and a yoke 120. In an embodiment, the rotor hub system 200 is configured to rotate about the mast 122. In an embodiment, the mast 122 may be configured to transfer a rotational force and/or torque (e.g., from a transmission, a drive system, etc.) to the rotor hub system 200. In an embodiment, the mast 122 may generally comprise one or more interfacing surfaces (e.g., splines, grooves, etc.) and may extend along a longitudinal axis 500. In an embodiment, the diameter of the mast 122 may be sized for an application (e.g., an aircraft) as would be appreciated by one of ordinary skill in the art upon viewing this disclosure.

Figure 4:
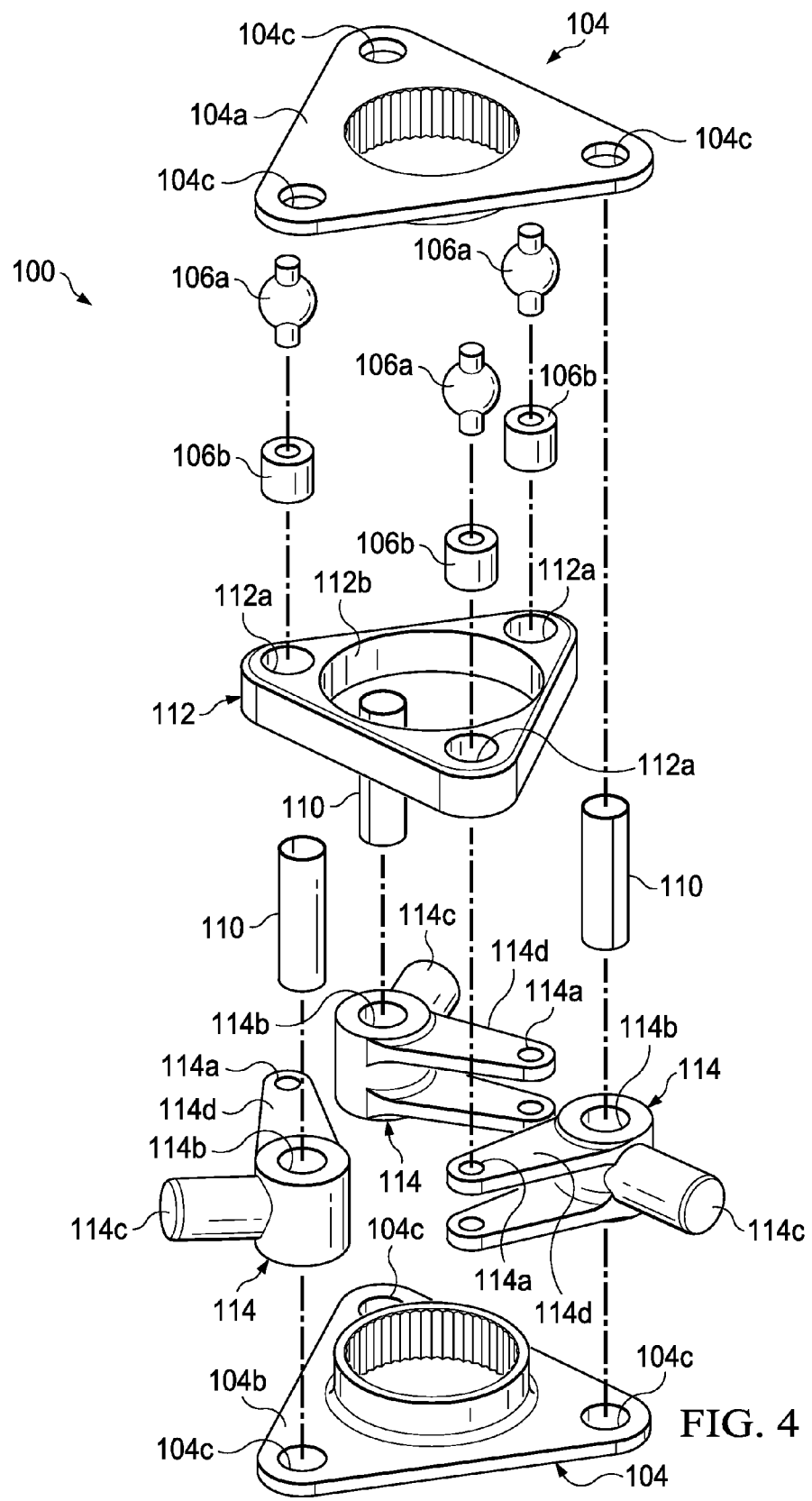
FIG. 4 is an exploded view of an embodiment of a multilink constant velocity joint.

FIGS. 2-4 also illustrate the MCVJ 100. The MCVJ 100 may comprise a housing 104, a floating plate 112, and a plurality of drive link trunnions 114. In an embodiment, the housing 104 may comprise an upper housing plate 104a and a lower housing plate 104b. The upper housing plate 104a and the lower housing plate 104b may be configured to mate and/or couple to each other via one or more suitable interfaces (e.g., bolts, etc.). For example, the upper housing plate 104a and the lower housing plate 104b may each comprise a plurality of bolt bores and/or bushing bores (e.g., housing bores 104c) for the purposes aligning and/or combining (e.g., via one or more bolts, shafts, bushings, bearings, etc.) the upper housing plate 104a and the lower housing plate 104b. Additionally, the upper housing plate 104a and the lower housing plate 104b may be configured to engage and/or couple the housing 104 (e.g., the upper housing 104a and the lower housing plate 104b) to the mast 122. For example, the mast 122, the upper housing plate 104a, and the lower housing plate 104b may each comprise one or more splined cylindrical surfaces, which may engage and/or interface with each other for the purpose of coupling the mast 122, the upper housing plate 104a, and the lower housing plate 104b to each other and preventing rotation there between. In an embodiment, the upper housing plate 104a and the lower housing plate 104b may be formed of a metal (e.g., stainless steel, carbon steel, etc.), a composite material (e.g., carbon fiber, fiberglass, etc.), or any other rigid material as would be appreciated by one of ordinary skill in the art upon viewing this disclosure. Additionally, in an embodiment, the housing 104 (e.g., the upper housing 104a and the lower housing plate 104b) may be any suitable geometric shape (e.g., triangular, circular, ovular, etc.) as would be appreciated by one of ordinary skill in the art upon viewing this disclosure.

In an embodiment, the floating plate 112 may comprise a plurality of bolt bores and/or bushing bores (e.g., one or more floating plate bores 112a) and a mast bore 112b. The floating plate 112 may be positionable within the housing 104 and may be coupled to the housing 104 (e.g., via the plurality of drive link trunnions 114), as will be disclosed herein. For example, the floating plate 112 may be coupled to the drive link trunnions 114 via a plurality of bearings (e.g., a first bearing portion 106a disposed within a second bearing portion 106b). Additionally, the bearings 106 may be configured to restrict and/or to prohibit movement of the floating plate 112 in one or more directions with respect to the housing 104. Such bearings may comprise rubber, other elastomeric compounds, or any other suitable type and/or configuration of material as would be appreciated by one of ordinary skill in the art upon viewing this disclosure.

In an embodiment, the mast bore 112b may be generally characterized as having a bore diameter greater than the outer diameter of the mast 122. For example, the mast bore 112b may be sized such that the floating plate 112 (e.g., the mast bore 112) does not engage the mast 122 as the floating plate 112 is positioned within the housing 104 even when the floating plate 112 is translated relative to the longitudinal axis 500. The amount of translation that the floating plate 112 will accommodate depends on the sizing of the mast 122 and the mast bore 112b. Additionally, in an embodiment, the floating plate 112 may be any suitable geometric shape (e.g., triangular, circular, ovular, etc.) as would be appreciated by one of ordinary skill in the art upon viewing this disclosure.

In an embodiment, the drive link trunnions 114 may be generally configured to position and/or to retain the floating plate 112 within the housing 104 and to translate motion from the yoke 120 to the floating plate 112, as will be disclosed herein. In an embodiment, the drive link trunnion 114 may generally comprise a pivoting arm 114d, a trunnion body 114c, and a plurality of interfacing bores (e.g., a shaft bore 114b, a bearing bore 114a, etc.). In an embodiment, the drive link trunnions 114 may each be coupled to the housing 104 (e.g., the upper housing plate 104a and the lower housing plate 104b) via a trunnion shaft 110. For example, the drive link trunnion 114 may be configured to be coupled to the housing 104 via disposing the trunnion shaft 110 within the shaft bore 114b of the drive link trunnion 114 and one or more housing bores 104c. Additionally, the pivoting arm 114d may be configured to rotate in a first direction and/or a second direction (e.g., clockwise and/or counter clockwise) about the trunnion shaft 110. In an embodiment, the drive link trunnion 114 may be configured to engage and/or to couple with the floating plate 112, for example, via a bearing disposed within the bearing bore 114a of the drive link trunnion 114 and a floating plate bore 112a. In an embodiment, the drive link trunnion 114 may be configured such that rotation of the pivoting arm 114d (e.g., a clock-wise or counter clock-wise rotation about the trunnion shaft 110) may transfer a force onto the floating plate 112 and/or to absorb (e.g., dampen) a force from the floating plate 112, as will be disclosed herein.

Referring to FIG. 3, the drive links 118 may be disposed radially and equally spaced about the yoke 120 and/or the longitudinal axis 500. In an embodiment, each drive link 118 may be coupled to the MCVJ 100 (e.g., via the trunnion body 114c of a drive link trunnion 114) and the yoke 120 (e.g., via a pillow block 121). In an embodiment, the drive links 118 may be configured to provide the required degrees of freedom for the yoke 120 and/or attached blades (not shown) to flap relative to the longitudinal axis 500 of the mast 122. The drive links 118 may be alternating layers of rubber (or other elastomeric material) and metal arranged in a dog-bone configuration. In an embodiment, the drive links 118 may be as described in U.S. Pat. No. 5,186,686, which is hereby incorporated by reference.

In an embodiment, the hub assembly 102 may comprise an upper hub plate 102a and a lower hub plate (not shown). In an embodiment, the hub assembly 102 may be positioned and/or configured to encompass the MCVJ 100. For example, the upper hub plate 102a may cover an upper portion of the MCVJ 100 (e.g., the upper housing plate 104a) and the lower hub plate may cover a lower portion of the MCVJ 100 (e.g., the lower housing plate 104b). In such an embodiment, the hub assembly 102 may be coupled to the drive links 118 (e.g., the pillow blocks 121) and the yoke 120, for example, via a plurality of bolts. In an embodiment, the hub assembly 102 may be configured to transfer a force (e.g., a rotational force), for example, from the drive link 118 (e.g., via the pillow blocks 121) to the yoke 120. In an embodiment, the upper hub plate 102a and/or the lower hub plate may further comprise a hub spring and/or a spherical center element. The structure and use of such a hub assembly 102 is described in U.S. Pat. No. 6,296,444, which is hereby incorporated by reference.

The yoke 120 may be generally configured to couple the mast 122 (e.g., via the hub assembly 102) to a plurality of rotor or prop-rotor blades (not shown). In an embodiment, the yoke 120 may allow the blades 62 to rotate about a longitudinal axis (e.g., the longitudinal axis 500) or the mast 122, to flap in a direction perpendicular to the yoke 120 plane (e.g., to accommodate vertical loads), and/or any other articulation or movement as would be appreciated by one of ordinary skill in the art upon viewing this disclosure.

In an embodiment, the yoke 120 may be formed of a metal, a plastic, a composite material (e.g., fiberglass, carbon fiber, etc.), any other suitable material as would be appreciated by one of ordinary skill in the art upon viewing this disclosure, or combination thereof. The yoke 120 may be formed using conventional methods, for example, as disclosed in U.S. Pat. No. 4,293,276, which is hereby incorporated by reference. In an embodiment, the yoke 120 may be configured to support any suitable number of blades, for example, 2, 3, 4, 5, 6, 7, 8, 9, 10, etc.

In an embodiment, a rotational force error normalization method utilizing a MCVJ and/or a system comprising a MCVJ is disclosed herein. In an embodiment, as illustrated in FIG. 5, a rotational force error normalization method 400 may generally comprise the steps of providing a rotor hub system comprising a MCVJ 402 and operating the rotor hub system 404.

In an embodiment, when providing a rotor hub system comprising a MCVJ 402, a rotor hub system, such as a rotor hub system 200, comprising a MCVJ, such as MCVJ 100, may be provided. For example, a rotor hub system 200 comprising a MCVJ 100 may be incorporated and/or integrated with an aircraft (e.g., a helicopter main or tail rotor, tiltrotor, airplane, etc.). Generally, providing can include one or more of the steps of designing the MCVJ, manufacturing the MCVJ, and assembling the MCVJ.

In an embodiment, operating the rotor hub system 404 may comprise applying a rotational force to the rotor hub system 200 (e.g., the mast 122) via an engine, a crankshaft, a gear box, a transmission, a powertrain, or any other suitable apparatus configured to provide a rotational force (e.g., to a rotor, gear, rotor shaft, bearings, etc.) as would be appreciated by one ordinary skill in the art upon viewing this disclosure. In an embodiment, the mast 122 may be employed to apply and/or to transfer a rotational force to the rotor hub system 200, for example, for the purpose of rotating the rotor hub system 200 and/or a bladed propeller.

In an embodiment, applying a rotational force and/or performing one or more articulated movements (e.g., flapping the yoke 120) to the rotor hub assembly 200 may induce a rotational force error (e.g., a kinematic error, an oscillatory strain, a lateral wobbling, etc.), for example, within one or more components of the rotor hub system 200. For example, the rotational force applied to the rotor hub system 200 may induce an oscillatory strain and apply a lateral force (e.g., a force in the yoke plane) onto one or more drive link trunnions 114 of the MCVJ 100.

In an embodiment, the MCVJ 100 may be employed to attenuate (e.g., dampen) and/or to normalize the rotational force error generated by the rotational force applied to the rotor hub assembly 200. In an embodiment, the MCVJ 100 may be employed to compensate the lateral force (e.g., the rotational force error) applied to one or more drive link trunnions 114 of the MCVJ 100. For example, in response to a lateral force applied to one or more of the drive link trunnions 114, one or more drive link trunnions 114 may apply and/or transfer the lateral force onto the floating plate 112 of the MCVJ 100. In such an embodiment, the floating plate 112 may be displaced in response to the applied lateral force by one or more drive link trunnions 114, and thereby compensate the rotational force error to provide a compensated rotational force (e.g., a reduced and/or normalized rotational force error).

For example, referring to FIG. 6, a lateral force may be applied by a first drive link trunnion 114e onto the floating plate 112 in the direction of the mast 122. In such an embodiment, the pivoting arm 114d of the first drive link trunnion 114e may rotate about the trunnion shaft 110 in a direction (e.g., clockwise) away from a first drive link 118a (e.g., in a direction towards the mast 122), and thereby applying a lateral force onto the floating plate 112. In such an embodiment, the floating plate 112 may be displaced with respect to the first drive link 118a by a first displacement offset 502. Additionally, in such an embodiment, the lateral force applied to the floating plate 112 via the first drive link trunnion 114e may be experienced by and/or applied to a second drive link trunnion 114f and/or a third drive link trunnion 114g. For example, the floating plate 112 may apply a lateral force onto the pivoting arm 114d of the second drive link trunnion 114f and/or the third drive link trunnion 114g (e.g., via the bearing 106), and thereby cause the cause the pivoting arm 114d of the second drive link trunnion 114f and/or the third drive link trunnion 114g to rotate about the trunnion shaft 110. For example, in response to the applied lateral force of the floating plate 112 onto the second drive link trunnion 114f and/or the third drive link trunnion 114g, the second drive link trunnion 114f may rotate (e.g., counter-clockwise) about the trunnion shaft 110 in a direction toward a second drive link 118b (e.g., in a direction away from the mast 122) and/or the third drive link trunnion 114g may rotate (e.g., counter-clockwise) about the trunnion shaft 110 in a direction toward a third drive link 118c (e.g., in a direction away from the mast 122). In such an embodiment, the floating plate 112 may displace with respect to the second drive link 118b towards the second drive link 118b by a second displacement offset 503. Additionally, the floating plate 112 may displace with respect to the third drive link 118c towards the third drive link 118c by a third displacement offset 504. In such an embodiment, displacing the floating plate 112 with respect to one or more drive links 118 (e.g., the first drive link 118a, the second drive link 118b, and the third drive link 118c) may displace the floating plate 112 with respect to the mast 122 by a fourth displacement offset 505, and thereby compensate the rotational force error (e.g., the lateral force) to provide a compensated rotational force (e.g., a reduced and/or normalized rotational force error).

In an embodiment, where the rotational force error (e.g., the lateral force) is experienced by more than drive link trunnions 114 in the direction of the mast 122, the MCVJ 100 may operate in a discretionary manner, for example, employing a voting mechanism. For example, in the embodiment of FIG. 6, if a lateral force is experienced by two or more drive link trunnions 114 (e.g., the first drive link trunnion 114e, the second drive link trunnion 118f, and the third drive link trunnion 118g) the floating plate 112 may be displaced in the direction of the mast 122 via the drive link trunnion 114 providing the greatest magnitude of lateral force. For example, in an embodiment where a lateral force is applied to the floating plate 112 via two or more drive link trunnions 114, the drive link trunnion 118 providing the greatest magnitude of force to the floating plate 112 may exert a sufficient amount of lateral force to partially and/or substantially overcome the lateral force applied by each of the remaining drive link trunnions 118, and thereby displace the floating plate 112 to provide a compensated rotational force. In such an embodiment, the floating plate 112 may be displaced with respect to the mast 122 and/or the housing 104 in one or more directions dependent on the sum of the magnitudes of individually applied lateral forces (e.g., the applied lateral force via each drive link trunnion 114).

In an embodiment, during operation of the rotor hub system 200, the induced rotational force error may vary over time, for example, in direction and/or magnitude. In such an embodiment, the MCVJ 100 may provide continuous compensation for the purpose of reducing and/or normalizing the rotational force error during operation. For example, the floating plate 112 may continuously move and/or position (e.g., via the drive link trunnions 118) to compensate the rotational force error, and thereby provide a continuous compensated rotational force. For example, the floating plate 112 may move in a circular or elliptical path about the mast 122.

In an embodiment, a MCVJ, such as MCVJ 100, a rotor hub system comprising a MCVJ 100, such as the rotor hub system 200, a method of employing such a rotor hub system 200 and/or such a MCVJ 100, or combinations thereof may be advantageously employed to attenuate and/or to normalize a rotational force error (e.g., a kinematic error, an oscillatory strain, a lateral floating, etc.) during the operation of a rotational hub system. In an embodiment, as previously disclosed, a MCVJ allows an induced rotational force error to be damped via a transfer of induced lateral forces from the rotor hub system to the MCVJ (e.g., the floating plate) during operation. As such, a MCVJ may be employed to improve the performance of the rotor hub system, for example, via the attenuation of rotational force errors (e.g., kinematic errors). For example, such a MCVJ may allow for decreased vibrations, increased product life of one or more components (e.g., bearings), and/or additional component (e.g., drive links, bearings, etc.) sizing options.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Unless otherwise stated, the term "about" shall mean plus or minus 10 percent. Of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. An apparatus comprising:
a rotor hub system comprising:
a floating plate;
a plurality of drive link trunnions each comprising a pivoting arm and a trunnion body and positioned radially about the floating plate, wherein each drive link trunnion is coupled to the floating plate via a respective pivoting arm, and each drive link trunnion is rotatably coupled to a housing disposed about the floating plate via a respective trunnion shaft disposed within the drive link trunnion, each drive link trunnion configured to rotate about the respective trunnion shaft to move the floating plate; and
wherein the housing is configured to couple to a mast.

2. The apparatus of claim 1, further comprising:
a plurality of drive links each coupled to one of the trunnion bodies of the drive link trunnions; and
a yoke coupled to each of the drive links.

3. The apparatus of claim 2, wherein the floating plate comprises a mast bore.

4. The apparatus of claim 3, wherein the floating plate is configured to not contact the mast when being moved by the drive link trunnions.

5. The apparatus of claim 2, wherein the rotor hub system comprises three drive link trunnions and three drive links.

6. The apparatus of claim 1, further comprising a fuselage and an engine mechanically coupled to the mast.

7. An apparatus comprising:
a floating plate; and
a plurality of drive link trunnions each comprising a pivoting arm and a trunnion body and positioned radially about the floating plate, wherein each drive link trunnion is coupled to the floating plate via a respective pivoting arm, and each drive link trunnion is rotatably coupled to a housing disposed about the floating plate via a respective trunnion shaft disposed within the drive link trunnion;
wherein the drive link trunnions are configured to rotate about the respective trunnion shafts and move the floating plate in response to a force applied to the drive link trunnions.

8. The apparatus of claim 7, wherein the housing is configured to engage a mast, and wherein the floating plate is configured to translate relative to the mast.

9. The apparatus of claim 8, wherein the force comprises a plurality of lateral forces, and wherein the floating plate movement is dependent on a sum of lateral forces.

10. The apparatus of claim 9, wherein a rotational force error is compensated by transferring the lateral forces onto the floating plate.

11. The apparatus of claim 10, wherein the floating plate moves along a circular path.

12. The apparatus of claim 8, wherein the floating plate is configured to not contact the mast when being moved by the drive link trunnions.

13. The apparatus of claim 12, further comprising:
a plurality of drive links each coupled to one of the trunnion bodies of the drive link trunnions; and
a yoke coupled to each of the drive links.

14. The apparatus of claim 8, further comprising a fuselage and an engine mechanically coupled to the mast.

15. A method comprising:
providing a rotor hub system comprising a multilink constant velocity joint (MCVJ) comprising:
a floating plate; and
a plurality of drive link trunnions each comprising a pivoting arm and a trunnion body and positioned radially about the floating plate, wherein each drive link trunnion is coupled to the floating plate via a respective pivoting arm, and each drive link trunnion is rotatably coupled to a housing disposed about the floating plate via a respective trunnion shaft disposed within the drive link trunnion; and
wherein the drive link trunnions are configured to rotate about the respective trunnion shafts and move the floating plate in response to a force applied to the drive link trunnions.

* * * * *